(12) United States Patent
Herreria et al.

(10) Patent No.: US 11,977,473 B2
(45) Date of Patent: May 7, 2024

(54) PROVIDING A PSEUDO LANGUAGE FOR MANIPULATING COMPLEX VARIABLES OF AN ORCHESTRATION FLOW

(71) Applicant: ORACLE INTERNATIONAL CORPORATION, Redwood Shores, CA (US)

(72) Inventors: Jorge Herreria, Littleton, CO (US); Venkatesh Mohanram, Bengaluru Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/899,401

(22) Filed: Aug. 30, 2022

(65) Prior Publication Data

US 2023/0004477 A1    Jan. 5, 2023

Related U.S. Application Data (63) Continuation of application No. 17/171,978, filed on Feb. 9, 2021, now Pat. No. 11,461,217, which is a continuation of application No. 16/296,043, filed on Mar. 7, 2019, now Pat. No. 10,949,327.

(60) Provisional application No. 62/748,164, filed on Oct. 19, 2018.

(51) Int. Cl.
*G06F 9/44* (2018.01)
*G06F 11/36* (2006.01)

(52) U.S. Cl.
CPC ...... *G06F 11/3612* (2013.01); *G06F 11/3692* (2013.01)

(58) Field of Classification Search
CPC .............. G06F 11/3612; G06F 11/3692
USPC .................. 717/114–117, 123–127
See application file for complete search history.

(56) References Cited

U.S. PATENT DOCUMENTS 8,869,108 B2 * 10/2014 Utschig-Utschig ....... G06F 8/71
                                                            717/121
10,949,327 B2 * 3/2021 Herreria .............. G06F 11/3612
11,461,217 B2 * 10/2022 Herreria .............. G06F 11/3636

OTHER PUBLICATIONS

Ghosh et al., "Oracle Fusion Middleware Developer's Guide for Oracle SOA Suite, 11g Release 1 (11.1.1.6.3)", 2012, Oracle, Chapter 6, pp. 1-58. (Year: 2012).*

* cited by examiner

*Primary Examiner* — Ted T. Vo
(74) *Attorney, Agent, or Firm* — Trellis IP Law Group, PC (57) ABSTRACT

A pseudo language is provided for manipulating the complex variables associated with the orchestration flow. Verbs are specified in the pseudo language. The verbs cause operations to be performed on the complex variables during processing of the orchestration flow. A first verb of the verbs is specified with a first operation of the operations The first operation, when processed, transfers data from a first set of source elements in a source complex variable to new target elements in a target complex variable based on a description of a target schema of the target complex variable. The target complex variable does not include the first subset of source elements and the target schema includes the description of the first subset of the source elements.

20 Claims, 8 Drawing Sheets

PROVIDING A PSEUDO LANGUAGE FOR MANIPULATING COMPLEX VARIABLES OF AN ORCHESTRATION FLOW

CROSS REFERENCES TO RELATED APPLICATIONS

This application is a continuation of U.S. patent application Ser. No. 17/171,978, entitled TRANSFERRING DATA FROM A SOURCE COMPLEX VARIABLE TO A TARGET COMPLEX VARIABLE, filed on Feb. 9, 2021 (ORACP0247CNT1/ORA180764-US-CNT-1), which is a continuation of U.S. patent application Ser. No. 16/296,043, entitled MANIPULATION OF COMPLEX VARIABLES IN ORCHESTRATION APPLICATIONS, filed on Mar. 7, 2019 (ORACP0247/ORA180764-US-NP) which claims the benefit of U.S. Provisional Patent Application Ser. No. 62/748,164, entitled MANIPULATION OF COMPLEX VARIABLES IN ORCHESTRATION APPLICATIONS, filed on Oct. 19, 2018, which are all hereby incorporated by reference as if set forth in full in this application for all purposes.

BACKGROUND

The present application relates to computing and more specifically to systems and methods for manipulating computing objects, such data objects used to implement and orchestrate process-based software applications.

Systems for manipulating data objects and/or moving data between different data objects are employed in various demanding applications, including facilitating integrating (e.g., enabling interoperability and intercommunications between) different software systems; orchestrating process flows and enabling data to seamlessly pass between different steps of a process-based software application, and so on. Such applications often demand efficient, user friendly, versatile, and fault-tolerant systems and methods for selectively and accurately manipulating data of a target object using data from a source and/or one or more rules or methods.

Generally, process orchestration may involve transferring data between different steps or activities of one or more process-based business applications (e.g., which may be modeled by Business Process Modeling and Notation (BPMN) flows describing Business Process Execution Language (BPEL) composite process-based software applications) and selectively manipulating the data in accordance with the requirements of each step or software application. Such flows often require the mapping of complex data objects from one form or type to another form or type.

The complex data objects (also called complex variables) may include various hierarchical arrangements of fields or elements/attributes. The fields may be arranged in accordance with the object schema describing a namespace and associated organizational structure that the associated Document Object Models (DOMs) of the complex variables are structured in accordance with and should adhere to.

Integrations and orchestrations may require functionality for accurately mapping data from one complex variable (called the source) to another complex variable (called the target). In certain cases, the hierarchical structures of the source complex variables may differ from the structures of the target complex variables. Furthermore individual fields of the source and target complex variables may exhibit different properties, e.g., may accommodate specific types of data (e.g., integer, float, date, string, etc.) and may accommodate different numbers of (and arrangements of) data element instances.

As such, mechanisms for accurately editing or modifying fields of the target can be particularly important for accurate data mappings and successful integrations and orchestrations for process-based software applications. Conventionally, this can require that developers, when developing integration and/or orchestration flows, pay close attention to the properties and structures of the target and source complex variables to ensure compatibility between source data and target data (and associated structures, data types, properties, etc.) being mapped, and to avoid inadvertent data deletions and other errors.

This may require that the developer create/assign data fields (to the targets) in a particular order, so as to preserve the sequence or hierarchical relationships of elements of the sources when mapped to elements of the targets and vice versa. Conventional techniques, e.g., using BPEL and accompanying eXtensible Stylesheet Language Transformations (XSLT) mappings, may fail to enforce correct mappings, i.e., fail to detect errors related to attempts to map one complex variable, or portion thereof, into another.

Accordingly, the developer is often tasked with developing complex work-arounds so as to ensure consistency and to avoid errors in the data mappings. This may involve use of stage files and calling other web services to ensure that data is not lost during the data mapping process. However, use of stage files, etc., can be time-consuming and error prone.

Conventionally, when using conventional BPEL assignments for integrations and orchestrations, data fields from a source object are often mapped to a target object in a sequence corresponding to the order of the fields or elements in the target. If this practice is not adhered to, data of the target may be overwritten by incorrect fields, as conventional BPEL assignments may lack adequate built-in data-validation checks.

SUMMARY

An example embodiment provides a simplified replacement for Business Process Execution Language (BPEL) that is particularly suitable for facilitating design and implementation of process orchestrations and accompanying data mappings and manipulations of complex variables and/or hierarchically structured business objects.

The BPEL replacement, also called a pseudo language herein, incorporates enhanced mechanisms (including newly introduced programming language verbs, as discussed more fully below) for detecting mapping or transformation errors early (during design time as opposed to thereafter, e.g., at runtime) and sensing of target schema characteristics during runtime to facilitate smart implementation of the accompanying pseudo language statements and associated operations, e.g., the appending of data to a target complex variable (even if an element of the variable to be appended to is not specified in the target variable, but can be inferred by referring to the schema definition of the target variable); the assignment or insertion of data into a target complex variable (at automatically inferred proper locations in the target complex variable); the removal of data from complex variable, and so on.

An example method includes analyzing a statement involving the performance of an operation on the target complex variable, wherein the operation involves transferring of data from one or more elements of a source complex variable to one or more elements of the target complex variable; during design time, confirming, based on the analysis that the source complex variable and the target complex variable, that the complex variables have compatible numbers of element instances; processing, during runtime of a process orchestration flow that specifies the operation, a target schema of the target complex variable in view of the statement, so as to determine how to implement the operation; and implementing the operation based on the results of the processing.

Hence, various embodiments discussed herein provide efficient mechanisms to update fields of a complex-variable (e.g., target complex variable) without losing the existing data; to incrementally update fields of complex variables; to alleviate certain implementation responsibilities from developers (such as data type and cardinality checking of source and target complex variables, etc.); to ensure that data is assigned/appended in the proper sequence, and so on.

Furthermore, various embodiments provide a simplified BPEL replacement with enhanced mechanisms for detecting data mapping errors early (before runtime), and sensing of target schema characteristics to facilitate smart implementation of specialized verbs that form part of a pseudo language or language abstraction, as discussed more fully below.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Certain embodiments discussed herein are particularly useful for development, deployment, and implementation of process-based software applications. A process-based software application may be any software application definable by one or more sequences of steps, also called software activities. A sequence of steps of a process-based software application may be called a process flow. Process flows are often modeled and illustrated via swim lanes in a User Interface (UI) display screen. Process-based applications are often implemented via composite applications that may leverage different web services for different process steps.

For clarity, certain well-known components, such as hard drives, processors, operating systems, power supplies, routers, Internet Service Providers (ISPs), workflow orchestrators, process schedulers, Tenant Automation Systems (TASs), certain web services, virtual machines, middleware, enterprise databases, MetaData Services (MDS) modules, and so on, are not necessarily explicitly called out in the figures. However, those skilled in the art with access to the present teachings will know which components to implement and how to implement them to meet the needs of a given implementation.

Figure 1:
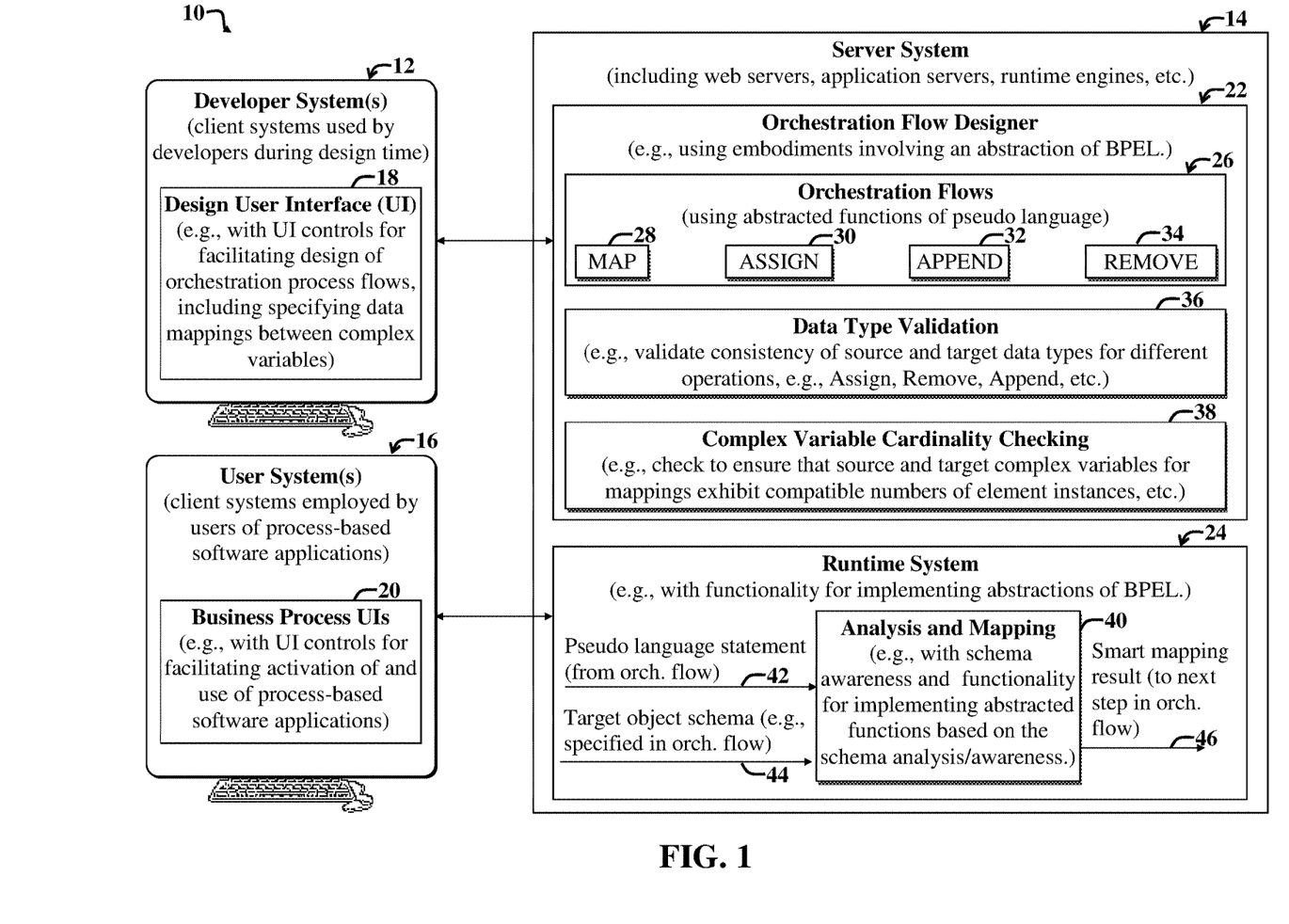
FIG. 1 illustrates a first example system and accompanying computing environment for facilitating orchestrations and associated data mappings for process-based software applications, which enables efficient, versatile, and robust manipulation of complex variables using an abstraction of Business Process Execution Language (BPEL), the abstraction called a pseudo language herein.

FIG. 1 illustrates a first example system 10 and accompanying computing environment for facilitating orchestrations and associated data mappings for process-based software applications. The example system 10 enables efficient, versatile, and robust manipulation of complex variables using an abstraction of BPEL. The abstraction is called a pseudo language herein, and provides a set of operations corresponding to verbs 28-34 (also called abstracted functions herein) that can be employed in statements of the pseudo language. The verbs 28-34 represent higher-level operations or functions, which can be implemented using underlying BPEL code, but with simplified and enhanced resiliency when compared to verbs currently specified in the BPEL specification.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

The overall system 10 includes one or more developer systems 12 in communication with a server-side orchestration flow designer 22 hosted on a server system 14, which includes one or more servers (e.g., web servers, application servers, etc.) that may represent (or be a part of) a cloud.

The orchestration flow designer 22 includes functionality for facilitating development of orchestration flows 26, which may be process-based software applications used to implement orchestrations involving the mapping of data from elements or fields of one complex variable into elements or fields of another complex variable, or may otherwise involve assigning, inserting, appending, or removing data from elements of a target complex variable.

For the purposes of the present discussion, a complex variable may be any computing object that includes a hierarchical structure of data arranged within categories of data (e.g., other objects) or otherwise hierarchically arranged. A first data element, attribute, or object that is within or subordinate to a second data object is called a child of the second data element. The second data element is called a parent of the first data element or attribute. Furthermore, the first data element and second data element may themselves represent complex variables or business objects. Note that an object may be any collection of data and/or functionality, and a business object may be any object that contains data and/or functionality related to a business or organization.

The orchestration flows 26 may be implemented using a strategic set of verbs, including map 28, assign 30, append 32, and remove 34. The new verbs, which may be implemented using underlying BPEL code, include strategic behaviors, such as enabling incremental updating of data objects (e.g., complex variables); efficient and selective modification of leaf nodes of complex variables; smart assignments of portions of data from a source complex variable into a target complex variable; appending of portions of data of a source complex variable into a target complex variable even if the element to be appended to does not currently exist in the target complex variable; removing of identified portions (e.g., identified by one or more statements of the pseudo language) of data from a complex variable, and so on.

For the purposes of the present discussion, programming language statements incorporating one or more of the newly developed verbs (i.e., assign 30, append 32, or remove 34) represent statements of an orchestration pseudo language discussed herein. For the purposes of the present discussion, an orchestration pseudo language may be any programming language that represents a higher level language or collection of one or more statements or constructs that are implemented via another process-execution language, such as BPEL.

In the present example embodiment, the orchestration flow designer 22 further includes a data-type validation module 36 and a complex variable cardinality checking module 38.

The data-type validation module 36 implements functionality for checking content of the orchestration flows 26, including source complex variables and target complex variables to ensure that the data types of the source complex variables are compatible with the data types of the target complex variables for the purposes of mapping data specified via one or more pseudo language statements using one or more of the verbs 28-34.

If a pseudo language statement of one of the orchestration flows 26 specifies a mapping (e.g., using the assign verb 30) from a first portion of a source complex variable to a second portion of a target complex variable that is of an incompatible data type relative to the first portion, then the data type validation module 36 will alert the developer. For example, an attempt to map or assign a date field into a name field can be caught by the data type validation module 36. This enables the developer to make adjustments or corrections to their orchestration flows and to catch errors early, i.e., before runtime, where such errors could be particularly problematic.

The complex variable cardinality checking module 38 implements functionality for confirming that the pseudo language correctly specify data mappings or operations between source complex variables and target complex variables, where the number of data elements to be mapped from the source complex variable match (or is otherwise compatible with) the number of data elements in the target complex variable to which the data elements of the source complex variable are to be mapped.

For example, if a given pseudo language statement specifies an operation that attempts to use the assign verb 30 to assign a first portion of a source complex variable that has five elements or children to a second portion of a target complex variable that has two elements or children, the complex variable cardinality checking module 38 may flag the error and notify the developer. Accordingly, this further enables the developer to catch errors early, during design time, as opposed to allowing such errors to propagate into problematic runtime errors.

After a given orchestration flow employing one or more pseudo language statements incorporating one or more of the verbs 28-34 is checked for data-type consistency (via the data type validation module 36) and cardinality consistency (via the complex variable cardinality checking module 38), the flow may then be moved to (or published to) the runtime system 24 for execution of the associated orchestration flow.

The runtime system 24 includes an analysis and mapping module 40, which implements the pseudo language statements and associated functionality represented by one or more of the verbs 28-34, as may be included in a particular orchestration flow. The analysis and mapping module 40 processes pseudo language statements 42 that are part of an orchestration flow and implements any of the associated verbs 28-34 included in the pseudo language statements. Implementation of the statements 42 and associated verbs 28-34 includes an analysis of the target schema 44 of the target complex variable to enable smart implementation of the pseudo language statements 42.

The implementation is said to be "smart," as the analysis and mapping module 40 is aware of or otherwise incorporates analysis of the target schema when implementing the verbs 28-34. For example, for an assign operation specified by a pseudo language statement using the assign verb 30, a target complex variable may be missing a particular entry that is defined in its schema, i.e., definition of the format of the target complex variable.

By analyzing the target schema, the analysis and mapping module 40 can determine where in the target complex variable to implement insert the data (into the target complex variable) from the source complex variable that is specified in the pseudo language statement. Accurate insertion of the data into the target complex variable can occur even if the specific location at which to insert the data in the target complex variable is not specified in the pseudo language statement. This represents and enhancement over other approaches involving use of BPEL and accompanying XSLT (eXtensible Stylesheet Language Transformations) to implement data mappings or transformations.

The analysis and mapping module 40 completes the operations specified in the pseudo language statement(s) 42, and the resultant updated or altered target complex variable can then be fed into a subsequent step in a given orchestration flow.

In summary, process orchestrations, also called integrations or orchestration integrations herein, may involve manipulation of complex variables (also called complex structures or complex objects herein) that also include complex structures (e.g., business objects). For example, a complex variable representing a price quote for an item may have a data structure with various fields, such as customer name, a ship-to field, date, item list, item names, item code, quantity, price, tax, and so on.

Certain embodiments discussed herein provide mechanisms that enable a user, e.g., developer, to manipulate (e.g., map, append, assign, or remove) the variables data at different steps on the orchestration.

Currently, orchestration and data integration systems often lack efficient mechanisms for assigning or appending data in to complex variables. While BPEL and accompanying XSLT (eXtensible Stylesheet Language Transformations) may be employed for integrations and complex variable manipulations, XSLT maps typically to not provide efficient ways to update variable fields. For example XSLT may delete or replace any existing data in a target complex variable that is being written to. If the target complex variable contains, for instance customer data, an XSLT map statement that only maps items for a price quote in the associated complex variable may delete the customer data in the complex variable, i.e., the customer data gets lost.

The various verbs 28-34; particularly the assign verb 30 and the append verb 32 provide mechanisms enabling a user to update some fields of a complex variable without losing existing data. This is enabled, in part, through schema awareness of the analysis and mapping module 40 of FIG. 1.

To populate the complex-variable fields, the industry generally provides ways to create statements that are expressed either as XPath (XML Path query language) expressions or JSON (JavaScript Object Notation) and/or JavaScript means, but not both.

The pseudo language (and accompanying verbs 28-34) discussed herein facilitate expressing statements in a polyglot (accommodating different languages) way, such that the statements of the pseudo language can be XPath expressions, JSON/JavaScript expressions, and/or other types of expressions.

Furthermore, the present example embodiment removes various implementation responsibilities (e.g., data type validation and cardinality checking) that the BPEL specification delegates to the developer. The system 10 of FIG. 1 can ensure that the data being assigned/appended to a given complex variable is cardinality-compatible (e.g., it may prevent assignment of an unbounded (aka repeating, aka Array) field into a bounded field). It further ensures that data being data being assigned/appended is data-type compatible, and ensures that ensures the field creation is performed in the proper sequence, i.e., in accordance with the sequence of the target object schema 44.

Note that with BPEL alone (i.e., not using embodiments discussed herein), to choose the correct constructor (copy, copy list, append, etc.) to assign or append data into a field of a complex variable, the developer must often evaluate several factors, including: whether or not the target element (of the target complex variable) exists at runtime; whether or not the target element cardinality is compatible with the operation, same for the Source (FROM) cardinality; whether or not the data type and cardinality of the source (from) is compatible with the target (to), and so on.

With BPEL alone, the developer may have to create/assign the data fields in top-down deep-first fashion to preserve the sequence defined by the schema which defines the complex variable shape or Document Object Model (DOM). For example in the price quote complex variable (discussed above), if the complex field for the customer is first; the item list is next, then the BPEL developer may have to create and assign the customer data first prior to creating, assigning, and/or appending the items list. Otherwise, the customer data will be created after the item list.

In addition, the BPEL specification alone does not specify efficient mechanisms to enforce any data-type validation. Generally, BPEL lets the developer assign incompatible complex and simple data types. For example, BPEL allows assigning the complex address data into the item name (which is a scalar/string), without flagging such assignments at design time.

The present example embodiment removes many of such responsibilities from the developer, while enabling users/developers to update the complex variables without losing the existing data.

Note that the present example embodiment need only use a small number of verbs 28-34 (versus 11 verbs used in BPEL) to efficiently achieve robust integrations and data mappings, transformations, or complex variable manipulations.

Figure 2:
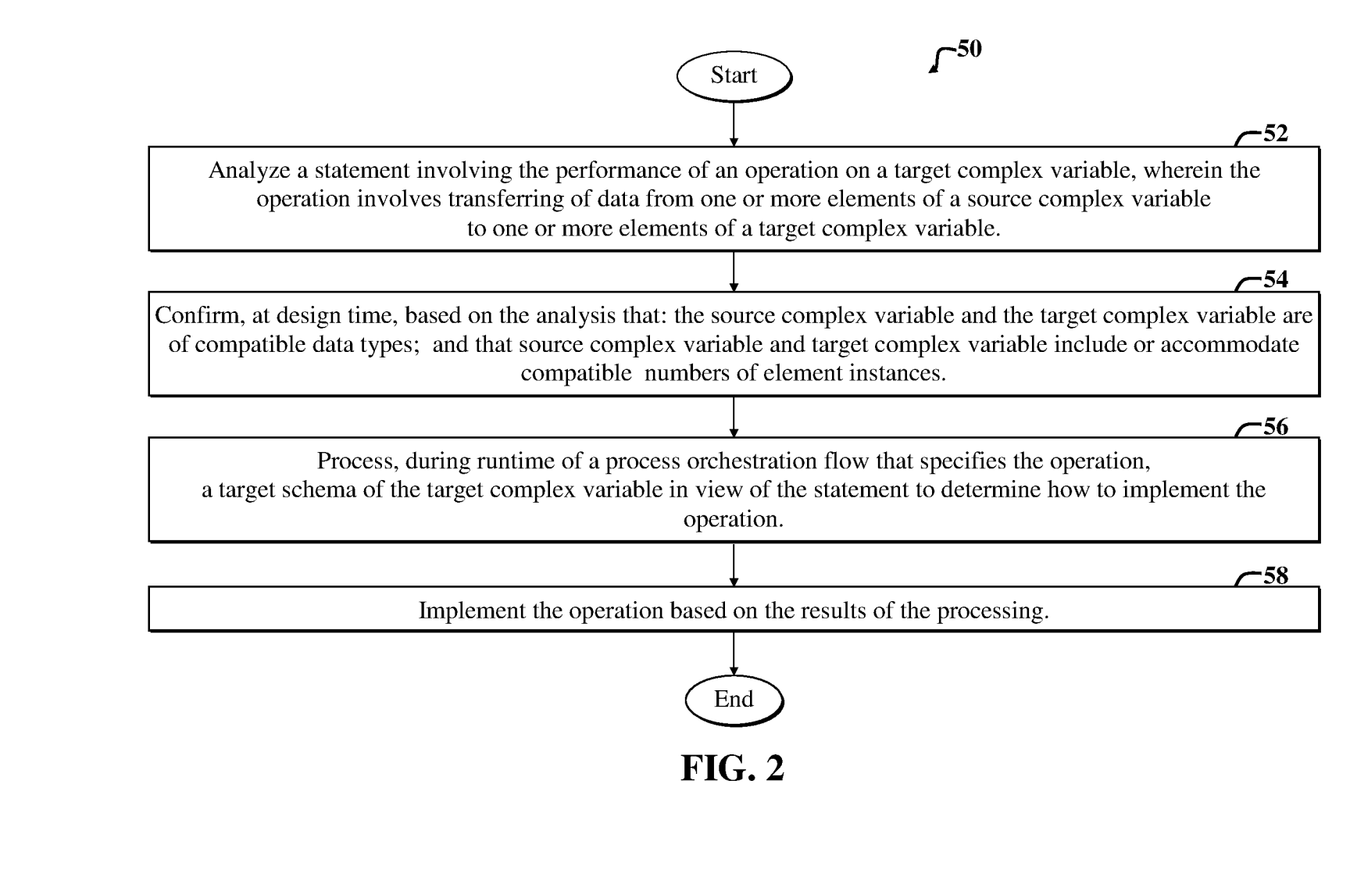
FIG. 2 is a flow diagram of a first example method that is suitable for use with the system of FIG. 1.

FIG. 2 is a flow diagram of an example method 50 that is suitable for use with the system 10 of FIG. 1. The example method 50 facilitates the mapping of or transformation of data from a source complex variable to a target complex variable during a process orchestration flow.

With reference to FIGS. 1 and 2, a first step 52 includes analyzing a statement (e.g., corresponding to the pseudo language statement 42 of FIG. 1) involving the performance of an operation on the target complex variable. The operation involves transferring of data from one or more elements of a source complex variable to one or more elements of the target complex variable. The operation may be part of one of the orchestration flows 22 of FIG. 1.

A second step 54 includes, at design time, confirming, based on the analysis that the source complex variable and the target complex variable are of compatible data types (e.g., using the data type validation module 36 of FIG. 1), and that the one or more elements of the source complex variable include compatible numbers of elements as in the one or more elements of the target complex variable (e.g., using the complex variable cardinality checking module 38 of FIG. 1), as discussed more fully below.

Note that in the present example embodiment, cardinality validation occurs at design time. The cardinality validation involves verifying that the element(s) of the source complex variable (i.e., source elements) to be mapped to a target are compatible with the portion (e.g., target element(s)) of the target complex variable to which the source element(s) is/are to be mapped. In other words, target elements of the target complex variable should be capable of having or accommodating the number of source elements that are to be mapped thereto from the source complex variable. In practice, this may mean that the target element(s) is capable of having the number of element instances as the source element instances to be mapped thereto.

For example, a complex variable that represents a price quote may have name, price, quantity, etc. as elements. A given price quote complex variable can have multiple instances of an item. For example, a price quote may have multiple prices (e.g., prices in Dollars, Euros, etc.). If a price quote's item is assigned to a purchase order's item, then the purchase order item shall be capable of having or storing the multiple items (e.g., prices in Dollars, Euros, etc.).

As another example, a source element to be mapped or assigned to a target element may have a cardinality of 1 (i.e., one instance only), and the corresponding target element may be specified as unbounded/unlimited. In this example case, the cardinality of the source element is not the same as the cardinality of the target element, but the cardinality of the source element and target element are compatible, as the unbounded target element can accept or accommodate the assignment of a single corresponding source element that is to be mapped to the unbounded target element.

As another example, if the source element is specified as including a maximum of 10 instances, and the target is specified as unbounded/unlimited, then the source element and target element are compatible in terms of cardinality, as the unbounded target element can accommodate the 10 source element instances.

As yet another example, if a source element is specified as unbounded/unlimited, and the target element accommodates only one element instance (e.g., specified as having a cardinality of 1), then the cardinality of the source element instance(s) and target element instance are not compatible. In this case, the accompanying system (e.g., the part of the system 10 of FIG. 1 corresponding to the orchestration flow designer 22) will detect this incompatibility and then ask the user to specify, filter, and/or select a single source element instance at design time.

A third step 56 includes processing, during runtime of a process orchestration flow that specifies the operation, a target schema of the target complex variable (e.g., as illustrated by the input schema 44 of FIG. 1) in view of the statement, so as to determine how to implement the operation; and implementing the operation (e.g., via the analysis and mapping module 40 of FIG. 1) based on the results of the processing.

Note that the example method 50 may be modified, without departing from the scope of the present teachings, e.g., the order of steps may be altered; new steps may be added or interchanged with existing steps; and so on. For example, the second step 54 may further specify that the indicated confirmations or validations occur during design time of a process orchestration flow, and that the confirmations further include data-type validation (e.g., as may be performed by the data type validation module 36 of FIG. 1) to ensure that the source complex variable is of a data type that is compatible with a data type of the target complex variable; and complex variable cardinality checking (e.g., as may be implemented via the complex variable cardinality checking module 38 of FIG. 1) to ensure that a number of elements in the source complex variable is to be mapped to a similar number of elements in the target complex variable.

The third step 56 may further include processing a pseudo language statement that includes one or more verbs specifying an operation to perform when mapping data from the source complex variable to the target complex variable. The one or more verbs may include an assign verb of the pseudo language, wherein the assign verb incorporates or is linked to functionality for enabling allocation of data to the target complex variable even when the target complex variable does not include a data element corresponding to an element specified in the statement.

The assign verb may further incorporates functionality for enabling allocation of data specifically to one or more leaf nodes of the target complex variable, without overwriting a parent node of the one or more leaf nodes.

The one or more verbs may further include an append verb of the pseudo language, wherein the append verb incorporates functionality for enabling incremental updating of a target complex variable. The one or more verbs may be implemented using BPEL, such that the one or more verbs represent higher level constructs or abstractions of BPEL functions.

Figure 3:
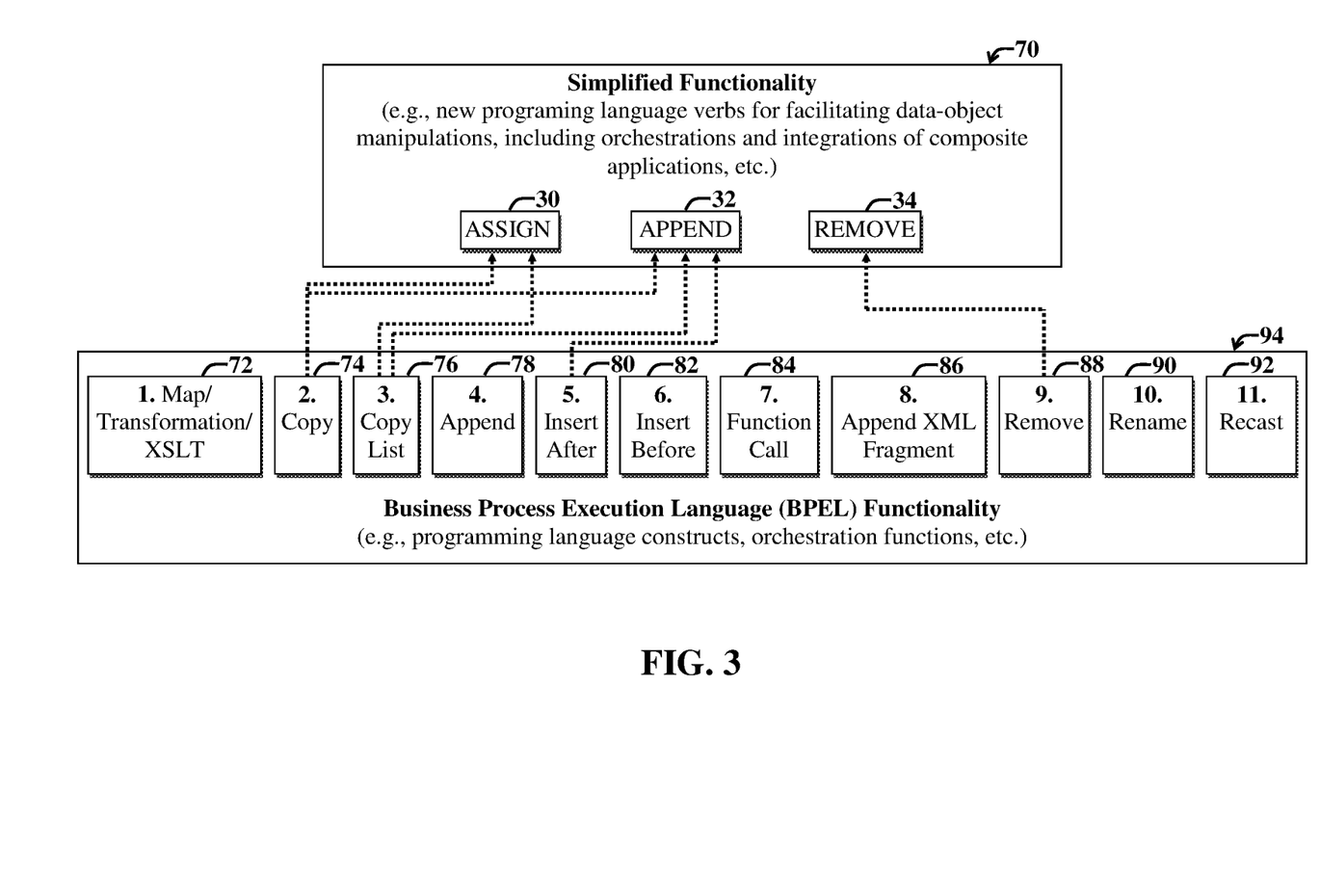
FIG. 3 illustrates example relationships between a set of BPEL verbs used for manipulating data objects, and verbs of the simplified higher-level pseudo language discussed herein.

FIG. 3 illustrates example relationships between a set of BPEL 94 assignment verbs (also called assignment constructors, or simply, assignments) 72-92 used for manipulating data objects, and verbs 30-34 of the simplified higher-level pseudo language 70 discussed herein. The simplified functionality 70 is analogous to a higher-level layer that is stacked on top of the BPEL functionality 94, where the simplified verbs 30-34 and associated functionality may be implemented via underlying BPEL verbs and functionality.

The example BPEL functionality 94 is shown including eleven verbs 72-90 or data-object manipulation functions or activities. The verbs include map 72, copy, copy list 76, append, 78, insert after 80, insert before 82, function call 84, append XML fragment 86, remove 88, rename 90, and recast 92.

Note that BPEL functionality 94 includes additional programming language constructs, in addition to the example eleven verbs 72-90 shown, which are usable to construct the verbs 30-34 of the pseudo-language functionality 70. For example, additional constructs, such as Switch, CountNodes( ), etc. may be used to implement the various higher-level verbs 30-34.

For illustrative purposes, the new assign verb 30 is shown selectively making use of BPEL copy 74 and copy list 76 verbs. The append verb 32 selectively leverages BPEL copy 74, copy list 76, and insert after 80 verbs. The new remove verb 34 uses the BPEL remove verb 88.

Note that the new verbs 30-34 are not limited to being implemented using the BPEL verbs 72-92 shown in FIG. 3. In fact, another language, other than BPEL, may be used to implement the data-object manipulation functionality of the new verbs 30-34, as discussed herein, without departing from the scope of the present teachings.

Note that in practice, whether a particular implementation or use case of the new assign verb 30 uses BPEL copy 74, copy list 76, and/or other verbs, functions, and/or constructs, is implementation specific and use-case specific. Similarly, the specific BPEL functionality 94 used to implement the append verb 32 and the remove verb 34 are implementation specific and use-case specific. For example, different uses of the assign verb 30 or append verb 32 (in associated programming language statements) may require use of different BPEL functionality 94, depending on demands implicit in the operation to be performed, as specified by the programming language statements and the source and target data objects, properties, schema definitions, and so on.

Generally, the fault-tolerant, simplified functionality 70 for facilitating data-object manipulations, is based on the three primary verbs 30-34, including assign 30, append 32, and remove 34. The methods associated with the verbs 30-34 enforce data-type validation, cardinality checking, schema-order enforcement (e.g., ensuring that data is assigned to a target in an appropriated order), and so on, during design-checks.

During runtime, schema definitions are also used to implement operations specified by each use of the verbs 20-24. For example, regardless of whether assign 30, append 32, or remove 34 verbs are used, it's possible that the data element to be assigned to, appended onto, or removed does not exist in the target data object at runtime.

Conventionally, a BPEL developer would have to painstakingly write statements using one or more of the BPEL verbs 72-92 to check if a particular element to be manipulated exists in the target data object; and if the element does not exist, then create and add the new element before attempting to remove it, assign data to it, and/or append data to it. If the developer does not perform such painstaking and tedious steps during development, then the developed BPEL code may crash at runtime.

Note that use of the verbs 30-34 efficiently mitigates the previously required tedious steps. Use of the verbs 30-34 include built in functionality for automatically checking the target data object and associated DOM and schema, and automatically creating any requisite element in accordance with the target object schema.

Accordingly, the developer is no longer required to know or manually discover if a field or element is present in a target data object. If the element is not present in the target data object, the analysis and mapping module 40 can automatically add the element and insert intended values (i.e., values specified via programming language statements using assign 30, append 32, and/or remove 34).

In an example use case scenario, a complex variable, such as a purchase order object, may have an address object included therein as a component of the purchase order object. The assign method 30 can facilitate, for instance, just assigning information into only the address portion of the purchase order.

For example, supposed that the address object is a complex variable, which includes sub-elements or fields, such as street, city, zip code, state, and so on. Now suppose that BPEL copy list 76 is used (e.g., in a copy list statement) to copy data into the address object. If the source object (also called the "from") is not a list, and/or the address object (the "to") is not organized as a list, then the associated BPEL code (e.g., code attempting to update address information in the address object) will crash at runtime.

Now, suppose that BPEL copy 74 is used to copy the address object into another address object of another target purchase order object. Use of the BPEL copy 74 will copy the entire source address object into the target address object of the target purchase order object. However, the data type, cardinality, structure, etc., between the source and the target should be compatible, or the conventional BPEL statements will crash at runtime. Use of the new assign verb 30 incorporates built-in intelligence to avoid such errors during design time, and implementation of more efficient functions during runtime, in part by leveraging schema awareness, as discussed more fully below.

Note that with use of the new assign verb 30, data in an element or field of a target complex variable that is being assigned data will be overwritten with the data being assigned to the element.

Note that the verbs 30-34 have been configured to enable statements using the verbs that enable the mapping of individual fields of a business object, and/or higher-level objects, i.e., complex variables, that include the individual fields and/or other objects. Accordingly, fields can be individually mapped, or the entire object can be mapped.

Fields or elements of an object can be appended using the append verb 30 (also called the append method). For example, if payload information of the above-described purchase order object has five lines or fields, and additional sixth line may be appended using the append verb 32, if the additional line is supported by the object's schema definition. The append method 32 will retain what is in the target complex variable, and append to it whatever data is specified as coming from the source complex variable for the purposes of appending into the target complex variable.

The append verb 32 uses similar schema awareness as does the assign verb 30, so as to facilitate target data object manipulations. For example, if the append method 32 is used to append an element into a target complex variable, the location as to where the element should be positioned within the target complex variable can be automatically inferred based on analysis and awareness of the target schema (e.g., as implemented via the analysis and mapping module 40 of FIG. 1).

Note that conventionally, a developer using the BPEL append 78, as opposed to the new pseudo-language append 32, should confirm that the element to be appended to exists in the DOM of the target data object (called the "To DOM"). However use of the new pseudo-language append 32 may analyze the schema of the target data object or complex variable, and then automatically create (in the DOM) an element that is to be appended to, if the element does not exist in the target data object, and if the schema of the target data object allows for creation of such an element.

As to the new remove verb 34 (also called the remove method), in an example scenario, a developer wishes to remove data from a price field of a purchase order object, e.g., so as to allow a target application to calculate and provide a new price. The price data in the target purchase order object can be blanked or deleted using the new remove method 34. Generally, if a field or element with data to be removed exists in the target data object, then the data therein will be removed. However, it the field or element does not exist, then the remove method 34 will not remove it. However, use of the conventional BPEL remove 88, i.e., to remove a field or element that does not exist, may result in crashing of the associated software at runtime.

In summary, conventional BPEL and XSLT methods 72-92 for implementing data mappings between a source and a target object generally lack efficient built-in data-type validation, cardinality checking, and so on. Accordingly, developers are prone to inadvertently implement data mappings between incompatible data fields and structures of source and target business objects.

The incompatibility may include cardinality incompatibilities and other data-type incompatibilities. For example, BPEL may allow assignment of complex address data into an item name field of a target, as BPEL methods lack built-in enforcement of data-type validation rules.

Generally, conventional BPEL methods allow the developer to assign incompatible complex and simple data types. For example BPEL allows (without flagging or alerting at design time) assignment of complex address data into a scalar or string, such as an item name.

These conventional BPEL issues are overcome via embodiments discussed herein, in part via the new verbs 30-34 and enhanced schema awareness, which can remove some developer implementation responsibilities, such as: ensuring that the data being assigned/appended exhibit compatible cardinalities (e.g., assignment of an unbounded field will be flagged during design time, if the developer attempts to specify assignment of the unbounded field into a bounded field); ensuring that the data being assigned and/or appended exhibit compatible data types (e.g., a date field will not be assigned into a name field); ensuring that field creation is done in the right structural order (e.g., a "b" section created after an "a" section and before a "c" section, as discussed more fully below), i.e., in accordance with the schema of the target variable, and so on.

Figure 4:
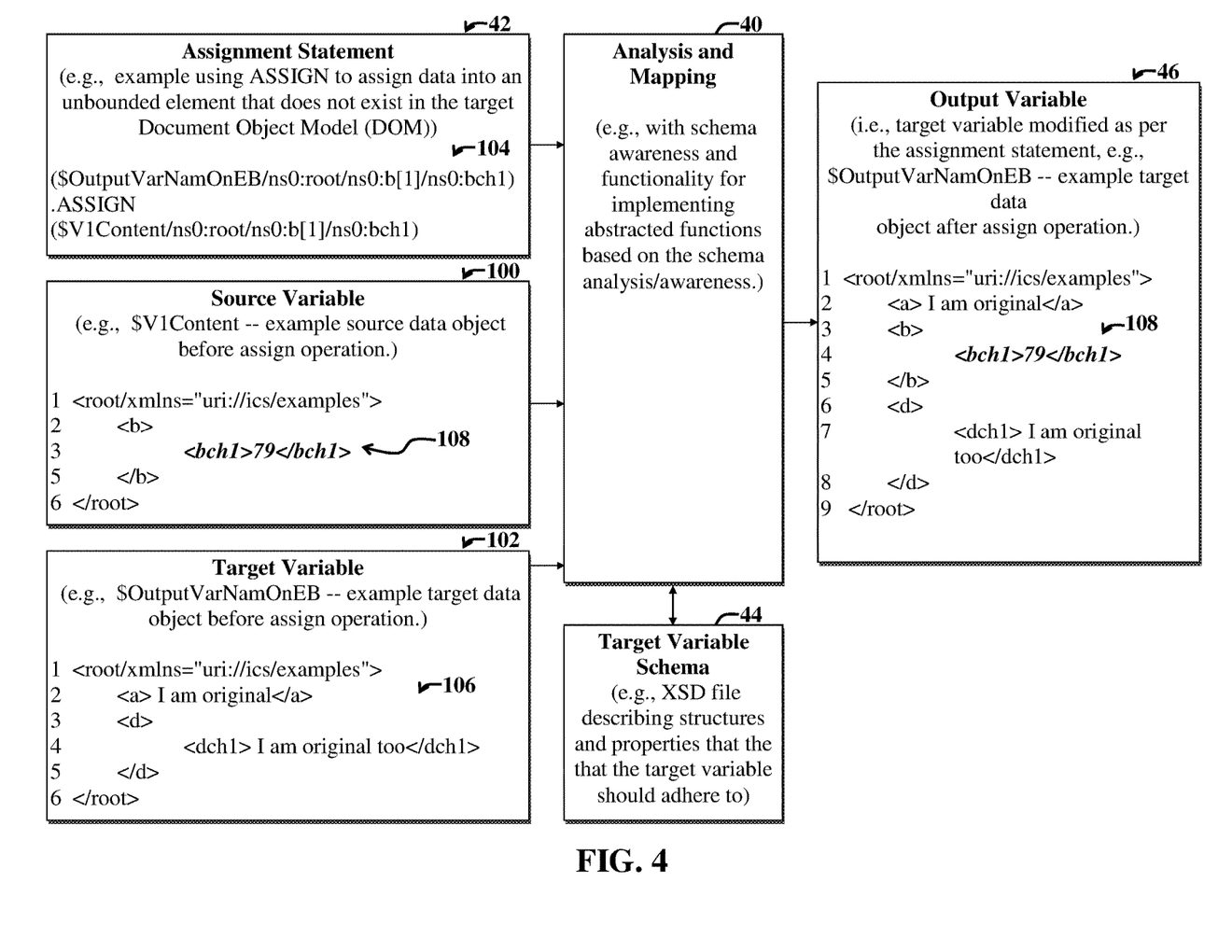
FIG. 4 illustrates an example use case involving specific example inputs and outputs of the analysis and mapping module of FIG. 1, and further illustrating use of schema awareness and a new pseudo-language ASSIGN verb to assign data into an unbounded element that does not initially exist in a target Document Object Model (DOM).

FIG. 4 illustrates an example use case involving specific example inputs 42, 100, 102, 44 and outputs 46 of the analysis and mapping module 40 of FIG. 1, and further illustrating use awareness of the target schema 44 and a new pseudo-language ASSIGN statement 104 to assign data into an unbounded element (e.g., <b> . . . </b> of the output variable 46) that does not initially exist in a target Document Object Model (DOM) 106 of a target variable 102.

An assignment statement 42 is represented by a specific example assignment statement 104 used to assign source data 108 from a source variable 100 into a structure (DOM) 106 of the target variable 102. Note that the specific assignment statement 104 specifies the target variable 102 (as $OutputVarNamOnEB) and associated node into which the bch1 data 108 from the source variable 100 is to be assigned. Similarly, the right-hand side of the specific assignment statement 104 specifies the source variable 100 (as $V1Content) and the source variable node with the bch1 data 108 to be assigned into the DOM 106 of the target variable 102.

Note that in the present example use case scenario, the target variable 102 and accompanying DOM 106 does not have a "b" section or element into which the source data 108 is to be assigned. Ordinarily, using conventional BPEL techniques, such an assignment would cause a runtime error, as the runtime engine would determine that the "b" section or element doesn't exist in the target variable 102, and therefore nothing can be assigned into it.

However, the present example embodiment employs awareness of the schema 44 of the target variable 102. If the analysis and mapping module 40 determines that the "b" section or element does not exist in the current DOM 106 of the target variable 102, it then determines whether or not the target variable schema 44 allows for the creation of such a "b" section or element in the target variable 102 (so as to yield the output variable 46 with the data 108 inserted at the proper location). Note that the example schema 44 is illustrated in more detail in FIG. 5.

In the present example scenario, the analysis and mapping module 40 determines that the target variable schema 44 allows for the creation of the "b" section 108 in the target variable 102, so as to thereby yield an updated version of the target variable 102 as the output variable 46. The output variable 46 includes the data 108 in a newly created "b" section or element, as obtained from the source variable 100 in accordance with the specific assignment statement 104.

Accordingly, the analysis and mapping module 40 processes the specific assignment statement 104, in view of the source variable 100, target variable 102, and target variable schema 44, so as to make appropriate modifications to the output variable 46 in accordance with the specific assignment statement 104, as allowed by the target variable schema 44.

Figure 5:
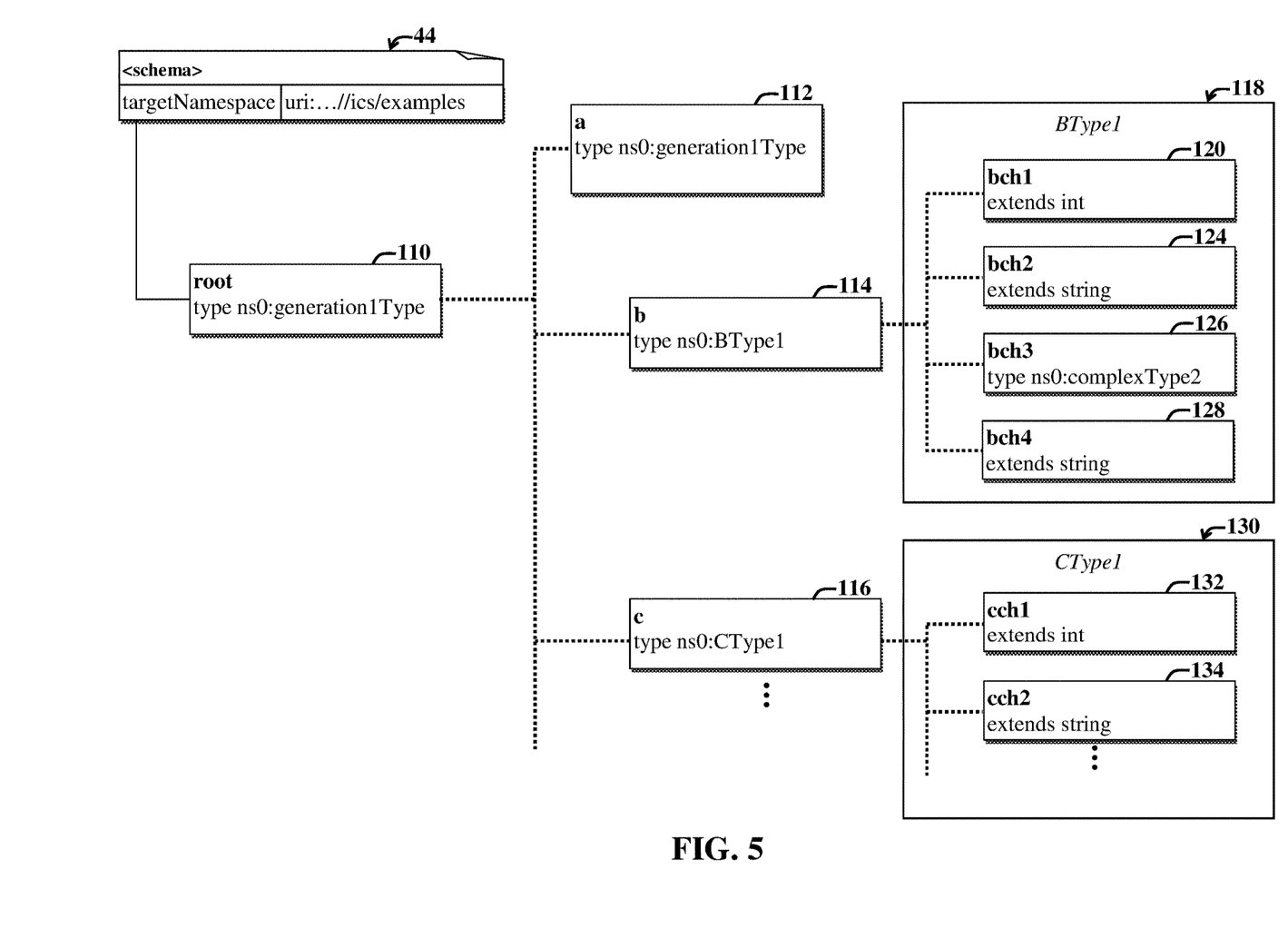
FIG. 5 illustrates a portion of an example schema of a data object, which may correspond to the target variable schema used by the analysis and mapping modules of FIGS. 1 and 4.

FIG. 5 illustrates a portion of an example schema 44 of a data object, which may correspond to the target variable schema 44 used by the analysis and mapping modules of FIGS. 1 and 4. The schema 44 may be implemented using an XSD (XML Schema Definition) file for setting forth rules (in accordance with a specified namespace) that a given computing object and associated DOM must follow to be considered valid.

The example schema 44 represents a portion of the schema for the target variable 102 of FIG. 4. The example schema specifies a root node 110, which can include various sub-sections (also called sub-objects, elements, sub-variables, or sub-nodes), including an "a" section 112, a "b" section 114, 118-128, a "c" section 130, 132-134, and so on.

In particular, with reference to FIG. 4, the DOM 106 of the target variable 102 does not have "b" or "c" section. However, the analysis and mapping module 40 can reference the target schema 44 to ascertain that the target variable 102 can accommodate a new "b" section 114 in the DOM 106, and that this section will occur after the "a" section 112 and before any "c" section 116 or latter sections, e.g., a "d" section.

Note that for other verbs (other than assign verb 30 of FIG. 3, and as used in the specific assignment statement 104 of FIG. 4), e.g., append 32 and remove 34 verbs, also leverage target variable schema awareness to manipulate the target variable 102 in accordance with the demands of the associated statement 104, but in conformity with the target variable schema 44. For example, the append 32 verb may also append data into an element that does not exist in a target variable DOM 106, i.e., if the target schema 44 allows for such element to be automatically created in the target variable 102.

System awareness of the target variable schema 44 when implementing the verbs 30-34 of FIG. 3, further enables built-in design-time data-type checking/validation, cardinality checking/validation, and other validity checking of code, e.g., statements using the verbs 30-34 of FIG. 3. This can help to prevent runtime errors, and thereby reduce associated costs.

In summary, with reference to FIGS. 4 and 5, certain embodiments can not only inhibit breaking of the schema definition of a target variable at design time, but at runtime, can also determine if and where a particular element to be assigned should be created and assigned into in target variable (e.g. the target variable 102).

For example, the analysis and mapping system 40 can determine whether a "b" element that the user wants to assign to the target variable 102 should be located between lines 2 and 3 in the target DOM 106, or elsewhere. For example, in certain scenarios, section "a" may not exist, but "d" might exist. The analysis and mapping module 40 can reference the target variable schema 44 to confirm that data of the "b" section should be placed before the "d" section.

Conventionally, a developer would have to conduct manual analysis of the target variable schema 44 and make decisions as to how to assign data into the target variable 102, but while risking crashing of the software at runtime if any mistake are made when observing the target variable DOM 106, schema 44, and so on.

Similarly, for appending data (e.g., using the append method 32 of FIG. 3), the analysis and mapping module 40 incorporates functionality for determining, for instance, that a user wishes to append a bch3 value into a "b" section of the target variable 102, where the "b" section does not exist in the DOM 106. The analysis and mapping module 40 of FIG. 4 may create the "b" section if it does not already exist in the DOM 106.

The creation of the "b" section is done in accordance with the target variable schema definition 44, thereby preserving the defined schema structure 44 in the DOM 106 after any modifications are made to the target variable 102 and associated DOM 106 via use of the new verbs 30-34 of FIG. 3.

Figure 6:
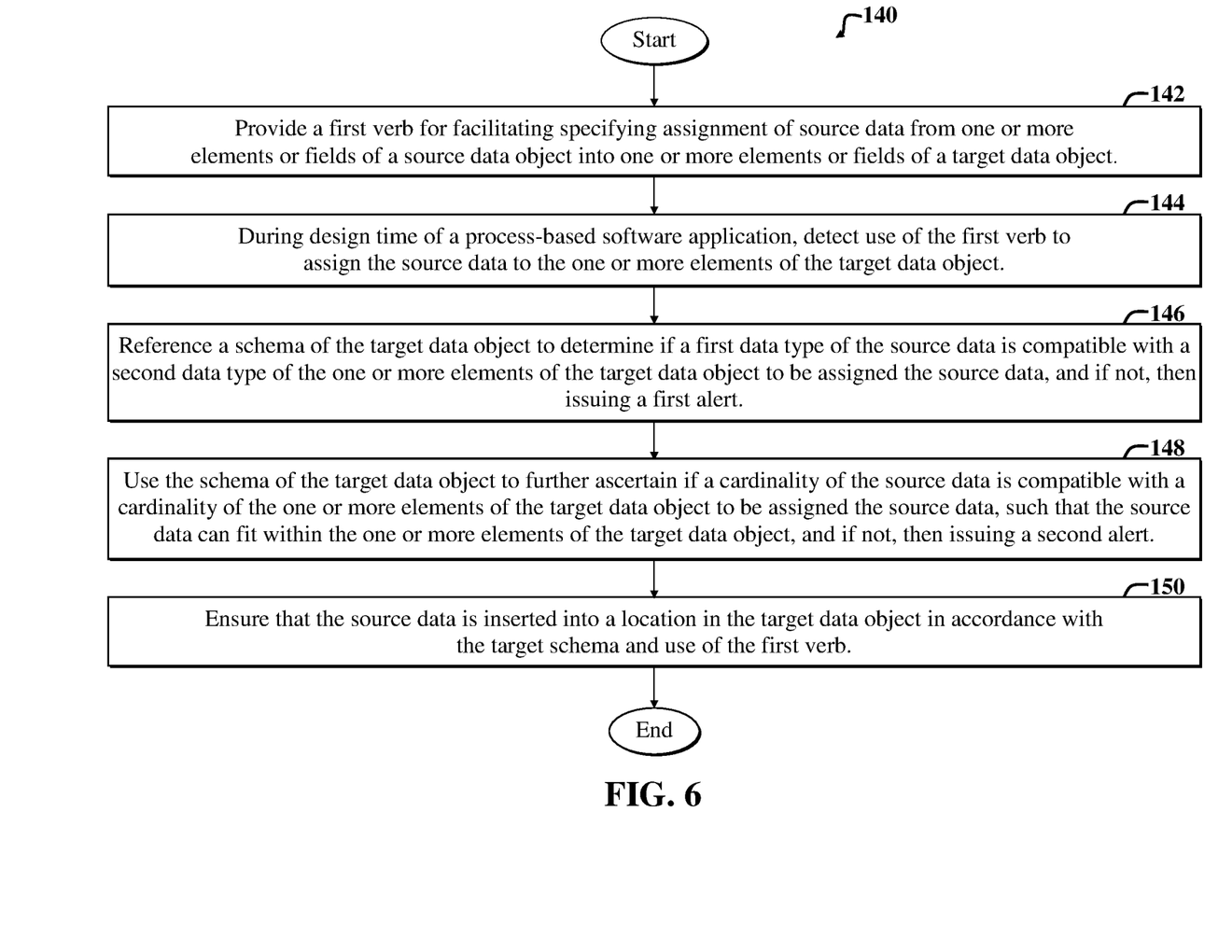
FIG. 6 is a flow diagram of a second example method that is usable with the embodiments of FIGS. 1-5.

FIG. 6 is a flow diagram of a second example method 140 that is usable with the embodiments of FIGS. 1-5. The second example method 140 facilitates manipulation of data objects, such as complex variables, used by a process-based software application and/or web service.

The second example method 140 includes an initial verb-providing step 142, which includes providing a first verb for facilitating specifying assignment of source data from one or more elements (e.g., corresponding to the "b" element and accompanying data 108 of FIG. 4) a source data object (e.g., the source variable 100 of FIG. 4) into one or more elements of a target data object (e.g., the target variable 102 of FIG. 4).

Subsequently, a verb-detection step 144 includes, during design time of a process-based software application, detecting use of the first verb (e.g., ASSIGN) to assign the source data to the one or more elements of the target data object.

Next, after detecting use of the first verb, a first schema-referencing step 146 includes referencing a schema of the target data object (e.g., the target variable schema 44 of FIG. 4) to determine if a first data type of the source data is compatible with a second data type of the one or more elements of the target data object to be assigned the source data (e.g., the data 108 of FIG. 4), and if not, then issuing a first alert.

A second schema-referencing step 148 includes ascertaining if a cardinality of the source data is compatible with a cardinality of the one or more elements of the target data object to be assigned the source data, such that the source data can fit within the one or more elements of the target data object, and if not, then issuing a second alert.

A third schema-referencing step 150 includes ensuring that the source data (e.g., data 108 of FIG. 4) is inserted into a location in the target data object (e.g., target variable 102 of FIG. 4) in accordance with the target schema (e.g., the schema 44 of FIGS. 4 and 5) and use of the first verb.

Note that the method 140 may be altered, without departing from the scope of the present teachings. For example, steps may be interchanged, omitted, or replaced with other steps, and steps and/or details may be added as needed to meet the needs of a given implementation.

For example, the second example method 140 may further specify providing a second verb, i.e., an append verb, for facilitating specifying appending of data from the source data object into the target data object; and providing a third verb, i.e., a remove verb, for facilitating specifying removing of data from the target data object.

The first verb may represent a pseudo-language assign function that uses one or more BPEL verbs to implement software functionality of the assign verb.

The second verb may also represent a pseudo-language append function that uses one or more BPEL verbs to implement software functionality of the append verb.

The second example method 140 may also specify that one more elements of the source data object include a source variable that is a subset of the source data object, and wherein the one or more elements of the target data object include a target variable that is a subset of the target data object. In this case, the source data object and the target data object represent a source complex variable and a target complex variable, respectively.

The second example method 140 may further include: during runtime, detecting when the target complex variable does not preexist in the target data object; referencing a schema of the target data object to determine if the target complex variable can be automatically created in the target data object, and generating a first signal in response thereto; automatically generating, in response to the first signal, a target complex variable in the target data object to accommodate the source data, wherein the target complex variable is created at a location in the target data object that is consistent with a location specified by the schema of the target data object.

Figure 7:
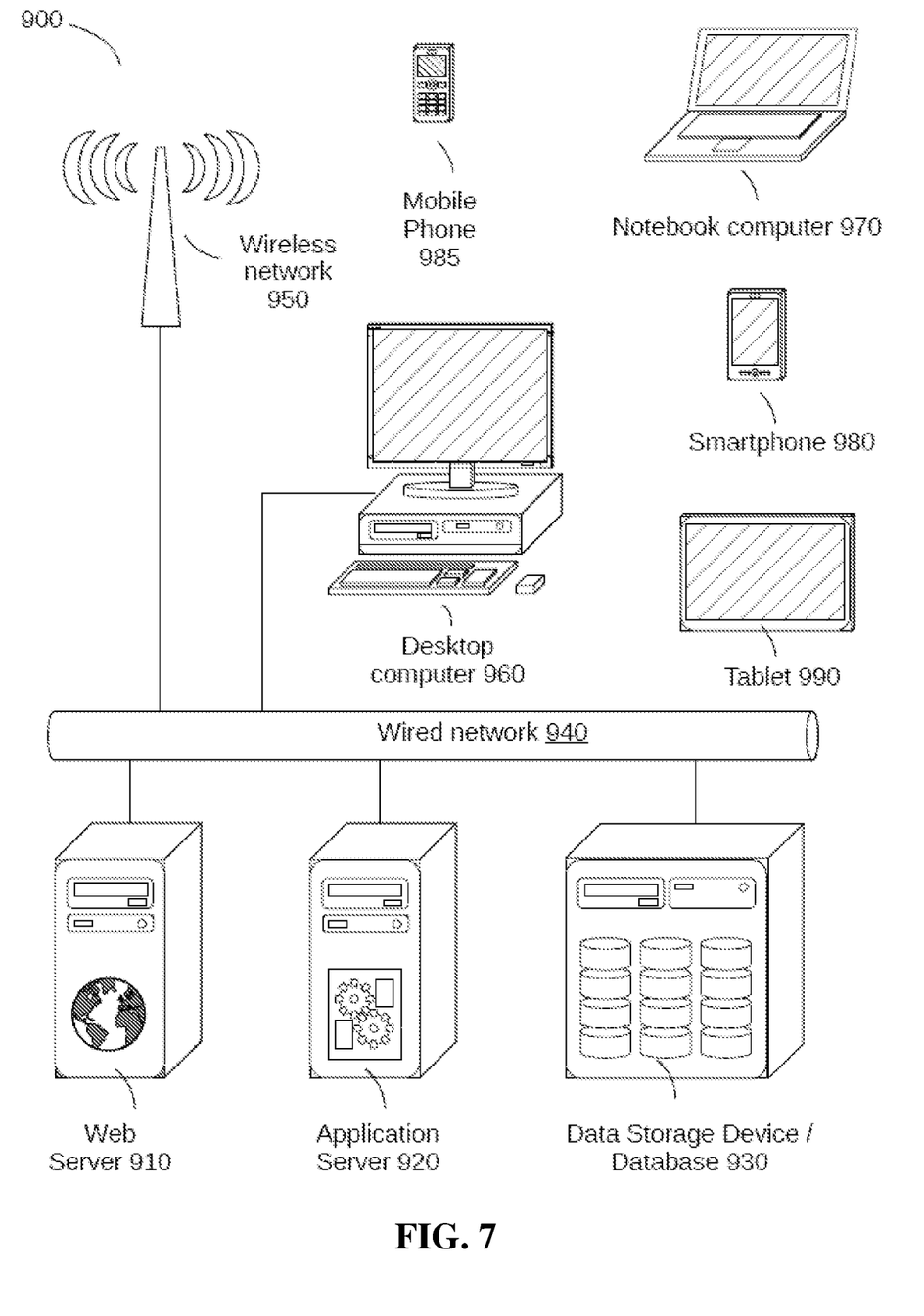
FIG. 7 is a general block diagram of a system and accompanying computing environment usable to implement the embodiments of FIGS. 1-6.

FIG. 7 is a general block diagram of a system 900 and accompanying computing environment usable to implement the embodiments of FIGS. 1-6. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language).

Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Figure 8:
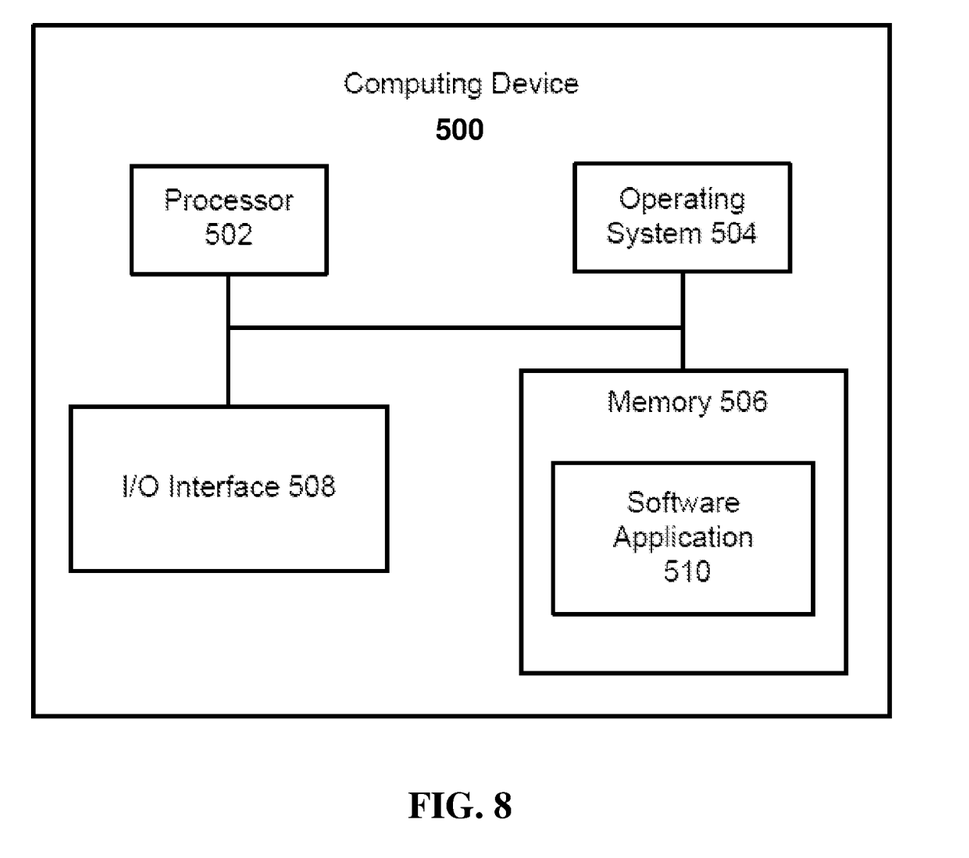
FIG. 8 is a general block diagram of a computing device usable to implement the embodiments of FIGS. 1-7.

FIG. 8 is a general block diagram of a computing device usable to implement the embodiments of FIGS. 1-6. While system 402 of FIG. 8 is described as facilitating performing the steps as described in certain implementations herein, any suitable component or combination of components of system 402 or any suitable processor or processors associated with system 402 may be used for performing the steps described.

FIG. 8 illustrates a block diagram of an example computing system 500, which may be used for implementations described herein. For example, computing system 500 may be used to implement server devices 910, 920 of FIG. 7 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 8 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while embodiments are primarily discussed as usable for manipulating complex variables implemented in XML during orchestrations involving process-based software applications, embodiments are not limited thereto. For example, embodiments may be readily adapted to selectively manipulate elements of data objects implemented in JSON or other languages, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory processor-readable medium including instructions for a method of providing a pseudo language for manipulating complex variables of an orchestration flow, the method comprising:
   providing the pseudo language for manipulating the complex variables associated with the orchestration flow; and
   specifying verbs in the pseudo language, wherein the verbs cause operations to be performed on the complex variables during processing of the orchestration flow; and
   specifying a first verb of the verbs with a first operation of the operations, wherein the first operation, when processed, creates new target elements in a target complex variable by copying a first subset of source elements in a source complex variable to a target complex variable based on a description of a target schema of the target complex variable and transfers data from a first subset of source elements in a source complex variable to the new target elements in the target complex variable based on the description of a target schema of the target complex variable, wherein the target complex variable does not include the first subset of the source elements prior to processing the first operation and the target schema includes the description of the first subset of the source elements.

2. The non-transitory processor-readable medium as recited by claim 1, wherein the method further comprises:
   receiving the orchestration flow that includes a statement involving the operation to be performed.

3. The non-transitory processor-readable medium as recited by claim 1, wherein the statement includes the first verb.

4. The non-transitory processor-readable medium as recited by claim 1, wherein the first verb is an assign verb.

5. The non-transitory processor-readable medium as recited by claim 1, wherein the verbs include an append verb that appends the first subset of the source elements to the target complex variable regardless of whether the first subset of the source elements exist in the target complex variable.

6. The non-transitory processor-readable medium as recited by claim 1, wherein the verbs include a remove verb that removes data in a target element of the target complex variable enabling a target application to recalculate data for the target element.

7. The non-transitory processor-readable medium as recited by claim 1, wherein the method further comprises:
   providing incremental update of the target complex variable.

8. The non-transitory processor-readable medium as recited by claim 1, wherein the method further comprises:
   providing a first hierarchy structure of leaf nodes, arranged according to categories, for the source complex variable; and
   providing a second hierarchy structure of leaf nodes, arranged according to categories, for the target complex variable.

9. The non-transitory processor-readable medium as recited by claim 8, wherein the method further comprises:
   providing selective modification of one or more of the leaf nodes of the target complex variable based on at least one of the verbs, wherein the verbs include an assign verb, an append verb, and a remove verb.

10. The non-transitory processor-readable medium as recited by claim 1, wherein the method further comprises:
    performing the first operation for a first step in the orchestration flow, wherein the first step specifies the first verb; and
    upon completion of the first operation, feeding the target complex variable into a subsequent step of the orchestration flow.

11. A method of providing a pseudo language for manipulating complex variables of an orchestration flow, the method comprising:
    providing the pseudo language for manipulating the complex variables associated with the orchestration flow; and
    specifying verbs in the pseudo language, wherein the verbs cause operations to be performed on the complex variables during processing of the orchestration flow; and
    specifying a first verb of the verbs with a first operation of the operations, wherein the first operation, when processed, creates new target elements in a target complex variable by copying a first subset of source elements in a source complex variable to a target complex variable based on a description of a target schema of the target complex variable and transfers data from a first subset of source elements in a source complex variable to the new target elements in the target complex variable based on the description of a target schema of the target complex variable, wherein the target complex variable does not include the first subset of the source elements prior to processing the first operation and the target schema includes the description of the first subset of the source elements.

12. The method as recited by claim 11, wherein the method further comprises:
    receiving the orchestration flow that includes a statement involving the operation to be performed.

13. The method as recited by claim 11, wherein the statement includes the first verb.

14. The method as recited by claim 11, wherein the first verb is an assign verb.

15. The method as recited by claim 11, wherein the verbs include an append verb that appends the first subset of the source elements to the target complex variable regardless of whether the first subset of the source elements exist in the target complex variable.

16. The method as recited by claim 11, wherein the verbs include a remove verb that removes data in a target element of the target complex variable enabling a target application to recalculate data for the target element.

17. The method as recited by claim 11, wherein the method further comprises:
providing incremental update of the target complex variable.

18. The method as recited by claim 11, wherein the method further comprises:
providing a first hierarchy structure of leaf nodes, arranged according to categories, for the source complex variable;
providing a second hierarchy structure of leaf nodes, arranged according to categories, for the target complex variable; and
providing selective modification of one or more of the leaf nodes of the target complex variable based on at least one of the verbs, wherein the verbs include an assign verb, an append verb, and a remove verb.

19. The method as recited by claim 11, wherein the method further comprises:
performing the first operation for a first step in the orchestration flow, wherein the first step specifies the first verb; and
upon completion of the first operation, feeding the target complex variable into a subsequent step of the orchestration flow.

20. An apparatus of providing a pseudo language for manipulating complex variables of an orchestration flow, the apparatus comprising:
one or more hardware computer processors; and
logic encoded in one or more non-transitory processor-readable medium for execution by the one or more hardware computer processors and when executed operable for:
providing the pseudo language for manipulating the complex variables associated with the orchestration flow; and
specifying verbs in the pseudo language, wherein the verbs cause operations to be performed on the complex variables during processing of the orchestration flow; and
specifying a first verb of the verbs with a first operation of the operations, wherein the first operation, when processed, creates new target elements in a target complex variable by copying a first subset of source elements in a source complex variable to a target complex variable based on a description of a target schema of the target complex variable and transfers data from a first subset of source elements in a source complex variable to the new target elements in the target complex variable based on the description of a target schema of the target complex variable, wherein the target complex variable does not include the first subset of the source elements prior to processing the first operation and the target schema includes the description of the first subset of the source elements.

* * * * *